United States Patent [19]

Matsuse et al.

[11] Patent Number: 4,721,897
[45] Date of Patent: Jan. 26, 1988

[54] REACTIVE POWER PROCESSING CIRCUIT FOR A CURRENT SOURCE GTO INVERTOR

[75] Inventors: Koki Matsuse, Tama; Hisao Kubota, Kawasaki, both of Japan

[73] Assignee: Kabushiki Kaisha Meidensha, Tokyo, Japan

[21] Appl. No.: 5,646

[22] Filed: Jan. 21, 1987

[30] Foreign Application Priority Data

Jan. 24, 1986 [JP] Japan .................................. 61-13482

[51] Int. Cl.⁴ .............................................. H02M 5/45
[52] U.S. Cl. ...................................... 318/767; 363/37; 363/58; 363/137
[58] Field of Search ........................... 363/37, 58, 137; 318/762, 803, 767

[56] References Cited

U.S. PATENT DOCUMENTS 4,567,555 1/1986 Matsuse et al. .......................... 363/37
4,580,205 4/1986 Matsuse .................................. 363/137

FOREIGN PATENT DOCUMENTS 227841 9/1985 German Democratic Rep. ..................................... 363/137
59-165970 9/1984 Japan .

OTHER PUBLICATIONS

Conference Record of the 1986 IEEE Industry Applications Society Annual Meeting Part 1.

*Primary Examiner*—William H. Beha, Jr.
*Attorney, Agent, or Firm*—Bachman & LaPointe

[57] ABSTRACT

A reactive power processing circuit for a current source GTO invertor in which a reactive current generated from a load of the GTO invertor is rectified by means of a fly wheel circuit and is sent to a capacitor so as to store a commutation surge voltage generated whenever a commutation of the invertor occurs, an excessive charge voltage across the capacitor is regenerated to a direct current output side of a power rectifier, and a pair of GTO (Gate Turn Off Thyristors) thyristors are connected between the capacitor and the direct current output side of the power rectifier in their forward directions so as to carry out a discharge operation for the excessive charge voltage across the capacitor. Consequently, with the number of circuit elements remarkably reduced, the reactive power processing at times of a high-frequency operation and acceleration/deceleration (variable speed) operation of the invertor can be achieved.

3 Claims, 5 Drawing Figures

REACTIVE POWER PROCESSING CIRCUIT FOR A CURRENT SOURCE GTO INVERTOR

BACKGROUND OF THE INVENTION

The present invention relates to a reactive power processing system for a current source GTO (Gate Turn Off Thyristor) invertor. In a current source GTO (Gate Turn Off Thyristor) invertor in which a plurality of GTO thyristors are used for switching elements of an inverter main circuit, no commutating circuit to forcefully turn off each GTO thyristor externally is required since the GTO thyristors have self detriggering capabilities, i.e., the GTO thyristor can be turned on and off depending on a polarity of a gate trigger signal applied to the gate terminal thereof. However, when the current source GTO inverter drives such a load as an induction motor having a reactance, a commutation surge voltage generated due to the reactance of the load may cause damages of some GTO thyristors. The commutation surge voltage is generated whenever each of the GTO thyristors is sequentially turned off.

A U.S. Pat. No. 4,580,205 issued on Apr. 1, 1986 (which corresponds to a Japanese Patent Application Unexamined Open No. Sho. 59-165970 and corresponds to an European Patent Application file No. 84 102 580.2) discloses a surge voltage clamping circuit for clamping the commutation surge voltage generated when each GTO incorporated in the current-type GTO bridge-connected invertor is turned off.

FIG. 1 shows the surge voltage clamping circuit disclosed in the above-identified Patent document.

In FIG. 1, a direct-current (DC) output derived from a power rectifier 1 including a plurality of bridge-connected thyristors (reverse blocking triode thyristors) whose gates are phase controlled is smoothed by means of a DC reactor having two inductive reactances 2A, 2B magnetically coupled to each other. The smoothed DC current id is inverted into an alternating current (AC) by means of a GTO bridge-connected invertor 3 and sent to an induction motor 4 which is a load of the invertor 3.

The invertor 3 includes six bridge-connected GTO thyristors $G_1$ through $G_6$ as main circuit switching elements. Each GTO thyristor $G_1$ through $G_6$ has a conduction interval of an electrical angle width of 120 degrees and is triggered for each pulse angle width of 60 degrees in such a conduction order as $G_1$, $G_6$, $G_3$, $G_2$, $G_5$, and $G_4$. Consequently, a rectangular wave alternating current having the electrical angle width of 120 degrees is outputted from the invertor 3.

In the invertor shown in FIG. 1, six times of commutations are carried out for one period (360°). The commutation surge voltage appearing on each arm of the GTO thyristors in the bridge configuration must be clamped. In addition, a reactive power in the induction motor 4 must be regenerated to the input power supply.

Therefore, a reactive power processing circuit (surge voltage clamping circuit) 6 and a fly wheel circuit 5 are disposed between the power rectifier 1 and invertor 3. The fly wheel circuit 5 includes six diodes $D_1$ through $D_6$ in a bridge configuration, each phase U, V, and W being connected to an intermediate alternating current input side of a pair of diodes $D_1$ and $D_2$, $D_3$ and $D_4$, and $D_5$ and $D_6$.

A commutation surge energy derived from the induction motor 4 is rectified by means of the fly wheel circuit 5 and is stored across a capacitor $C_1$ of the reactive power processing circuit 6 as a charge current. When an excessive charge in the capacitor $C_1$ occurs, two GTO thyristors $G_7$, $G_8$ in the processing circuit 6 are triggered to turn on so that the excessive charge current is sent to the DC side of the power rectifier 1.

The two GTO thyristors $G_7$, $G_8$ are simultaneously triggered to turn on when the voltage $e_{c1}$ across the capacitor $C_1$ is higher than the DC output voltage $e_d$ of the power rectifier 1 by a constant value. At this time, the power is regenerated to the DC current side of the power rectifier 1 along such a route as a reactor $L_{r2}$ of cumulative windings→GTO thyristor $G_8$→capacitor $C_1$→GTO thyristor $G_7$→reactor $L_{r1}$. In addition, when the voltage across the capacitor $C_1$ become reduced and reaches below the DC current side of the power rectifier 1 due to the discharge occurring when the above-described regeneration operation, both GTO thyristors $G_7$, $G_8$ are simultaneously turned off. Thereafter, electromagnetic energies stored in the two reactors $L_{r1}$, $L_{r2}$ are charged across the capacitor $C_1$ along such a route as reactor $L_{r2}$→diode $D_8$→capacitor $C_1$→diode $D_9$→reactor $L_{r1}$.

Both reactors $L_{r1}$, $L_{r2}$ are installed for the suppression of discharge current of the capacitor and the compensation for a difference between the output voltage of the power rectifier 1 and voltage across the capacitor $C_1$. The diodes $D_8$ and $D_9$ are installed for the energy absorption stored in the reactors $L_{r1}$ and $L_{r2}$.

Hence, the reactive power processing circuit shown in FIG. 1 requires the cumulative winding reactors $L_{r1}$, $L_{r2}$, GTO thyristors $G_7$, $G_8$, and diodes $D_8$, $D_9$. Consequently, the number of circuit elements are increased and the circuit accordingly becomes complex. In addition, the manufacturing cost is increased.

FIG. 2 shows another reactive power processing circuit (commutation surge voltage clamping circuit) disclosed in a Conference Record of the 1986 IEEE Industry Applications Society Annual Meeting Part I Pages 521 through 526. The reactive power processing circuit 6A shown in FIG. 2 is proposed to drive the induction motor 4 in a quadrant operation mode. The reactive power processing circuit 6A is installed since only the regeneration of the motor 4 to the DC current side of the power rectifier cannot suppress the voltage across the capacitor $C_1$ shown in FIG. 1. That is to say, a pair of GTO thyristors $G_9$, $G_{10}$ are disposed across the corresponding diodes $D_8$, $D_9$ so that the regeneration of the motor 4 to the alternating current power supply side via the power rectifier 1 can be achieved. Furthermore, a pair of diodes $D_{10}$, $D_{11}$ are disposed across the corresponding GTO thyristors $G_7$, $G_8$ because of the presence of the two reactors $L_{r1}$, $L_{r2}$.

Therefore, it follows that the more increases in the number of circuit elements and in the manufacturing cost.

In addition, a time constant between each of the reactors $L_{r1}$, $L_{r2}$ and capacitor $C_1$ causes a frequency range to be processed to be limited and a variable speed control for a high speed induction motor becomes difficult.

SUMMARY OF THE INVENTION

With the above-described problem in mind, it is an object of the present invention to provide a reactive power processing circuit for a current source GTO invertor which can achieve a remarkable reduction of the number of circuit elements and can achieve a high-frequency operation of an induction motor and extension of a variable frequency range thereof.

The above-identified object can be achieved by providing a reactive power processing circuit for a current source GTO invertor, comprising: (a) a power rectifier which carries out a gate phase control of a plurality of switching elements to convert an alternating current derived from an alternating current source into a corresponding direct current; (b) a smoothing circuit having at least one direct current reactor for smoothing the direct current derived from the power rectifier so as to produce a smoothed direct current; (c) an invertor main circuit having a plurality of bridge-connected gate turn off thyristors (GTO thyristors) for inverting the direct current derived from the smoothing circuit into an alternating current and for deriving a load with the alternating current at output sides thereof; (d) a fly wheel circuit having a plurality of bridge-connected diodes whose alternating current sides are connected to the corresponding output sides of the invertor main circuit, for rectifying a reactive current derived from the load; (e) a capacitor, connected across a direct current side of the fly wheel circuit, for storing a commutation surge voltage generated in the load; (f) a pair of GTO thyristors, connected to the capacitor in their forward directions, for operatively discharging a charge across the capacitor toard positive and negative poles of the power rectifier; and (g) a control circuit for triggering the pair of GTO thyristors to discharge the excessive charge across the capacitor and for continuing to send triggering pulses to the switching elements of the power rectifier for an interval required for a power rectifying operation of the power rectifier so that the switching elements are retriggered when a discharge operation of the pair of GTO thyristors is completed.

BRIEF DESCRIPTION OF THE DRAWINGS

A more complete understanding of the present invention may be obtained from the following detailed description taken in conjunction with the attached drawings in which like reference numerals designate corresponding elements and in which.

DETAILED DESCRIPTION OF THE PREFERRED EMBODIMENT

Figure 1:
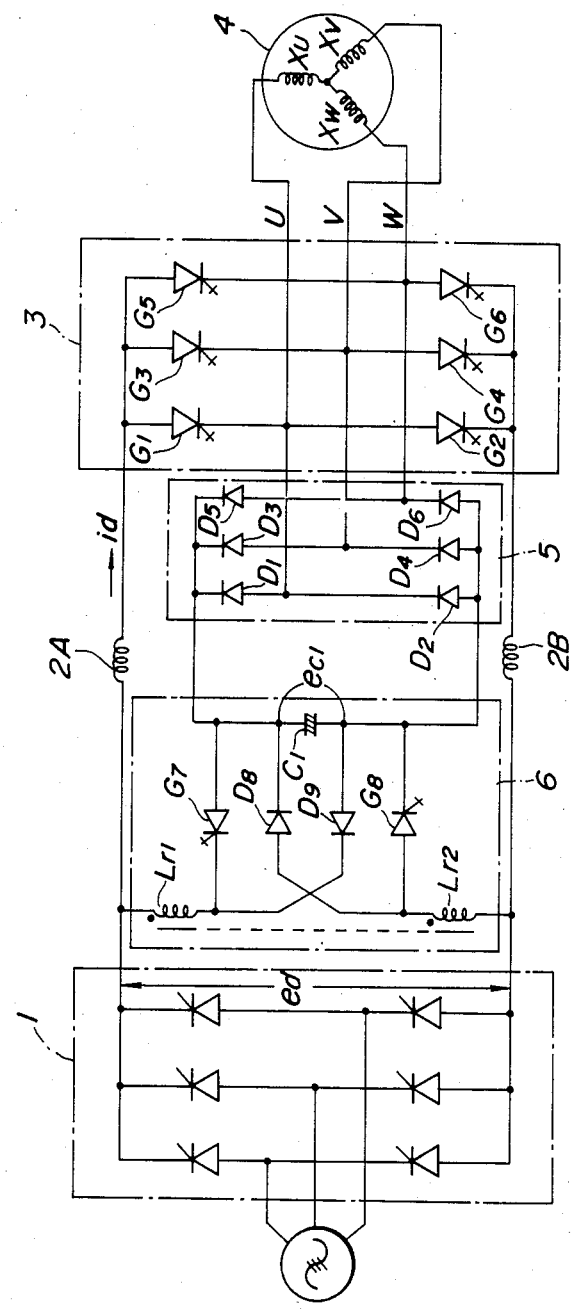
FIG. 1 is a circuit block diagram of a reactive power processing circuit for a current source GTO invertor disclosed in a U.S. Pat. No. 4,580,025 (which corresponds to a Japanese Patent Application Unexamined Open No. Sho 59-165970)
Figure 2:
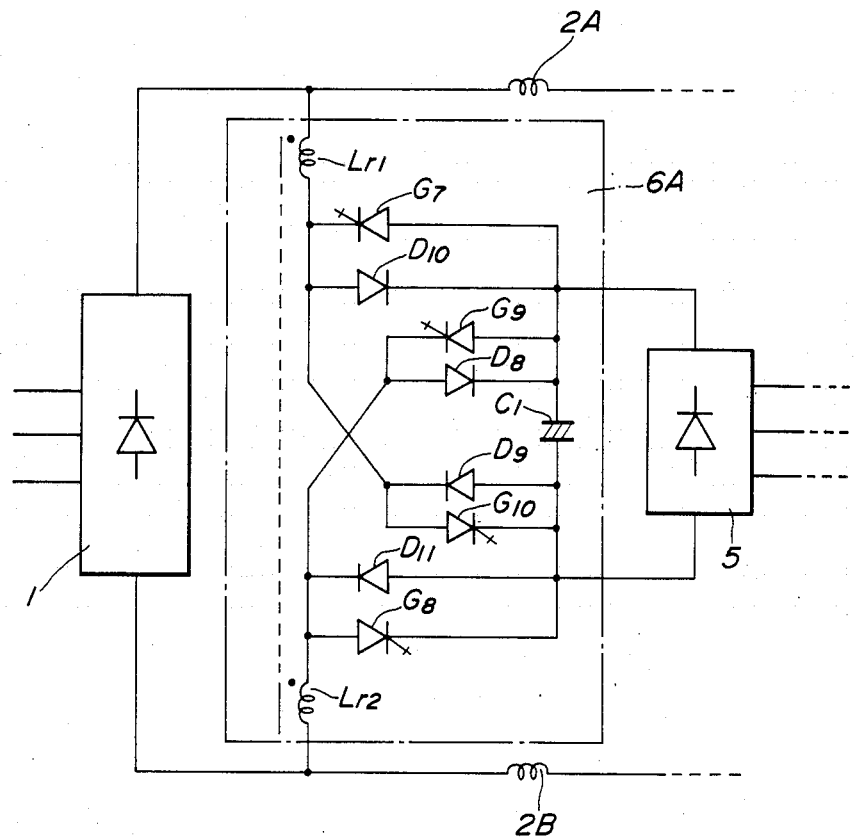
FIG. 2 is a circuit block diagram of another reactive power processing circuit disclosed in the Conference Record of the 1986 IEEE Industry Applications Society Annual Meeting Part I.

Reference will hereinafter be made to the drawings in order to facilitate understanding of the present invention. The previously proposed two reactive power processing circuits for the current source GTO invertor disclosed inthe U.S. Pat. No. 4,580,025 and disclosed in the Conference Record described above have already been described in the BACKGROUND OF THE INVENTION with reference to FIG. 1.

The power rectifier 1, DC current reactors 2A, 2B, fly wheel circuit 5, bridge-connected GTO invertor 3, and induction motor 4 have been described in the above-identified Patent document. The disclosure of the U.S. Pat. No. 4,580,025 is hereby incorporated by reference.

Figure 3:
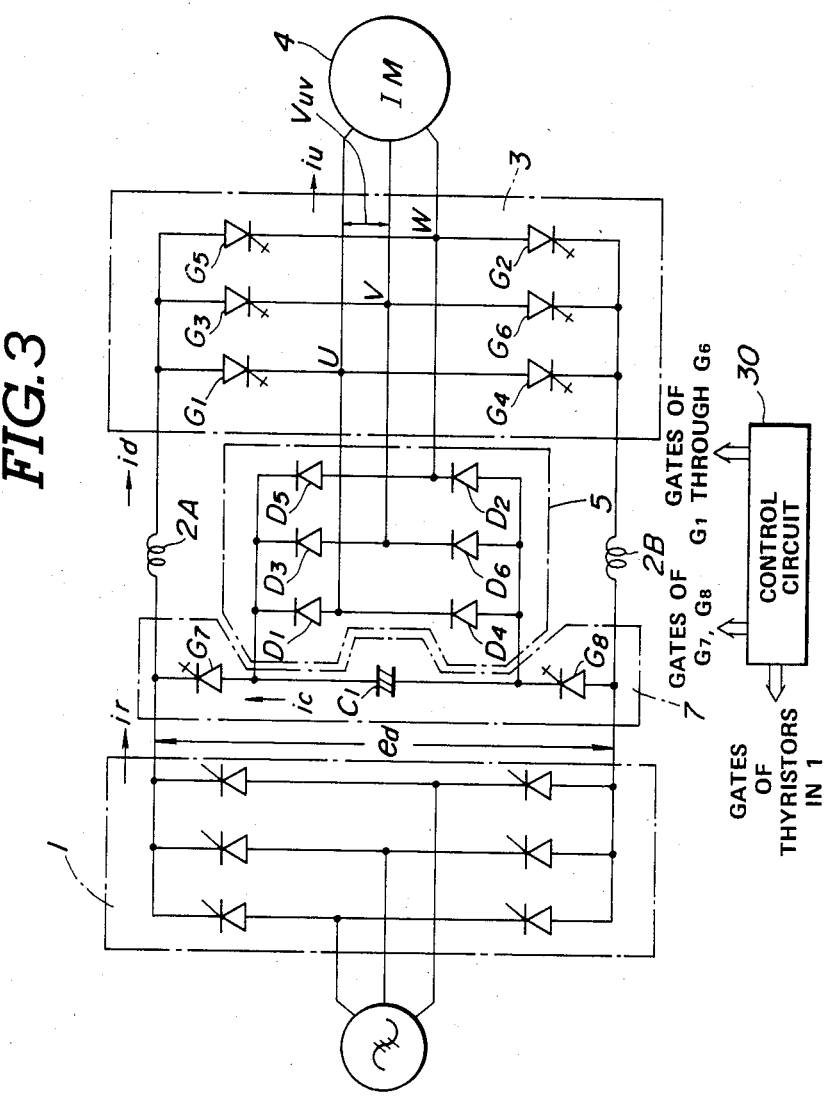
FIG. 3 is a circuit block diagram of a preferred embodiment of the reactive power processing circuit for the current source GTO invertor according to the present invention.

FIG. 3 shows a preferred embodiment according to the present invention.

In FIG. 3, the main circuit of the reactive power processing circuit 7 includes the capacitor $C_1$ (electrolytic type) connected across the DC current side of the fly wheel circuit 5 and a pair of GTO thyristors $G_7$, $G_8$, a cathode of the one GTO thyristor $G_7$ connected to the DC current side of the power rectifier 1 and to the DC reactor 2A, a cathode of the other GTO thyristor $G_8$ connected to a negative pole of the capacitor $C_1$, an anode of the one GTO thyristor $G_7$ connected to a positive pole of the capacitor $C_1$ and an anode of the other GTO thyristor $G_8$ connected to the other DC current side of the power rectifier 1 and to the reactor 2B.

In the main circuit construction of the reactive power processing circuit 7, the GTO thyristors $G_7$, $G_8$ are triggered whenever the invertor 3 carries out the commutation operation so that the reactive power is regenerated to the DC current side. This regeneration is carried out in the same manner during powering and regenerating operations of the induction motor 4. The triggering of the GTO thyristors $G_7$ and $G_8$ causes the capacitor $C_1$ to be discharged to the DC current side. Consequently, the conventionally used reactors $L_{r1}$ and $L_{r2}$ are omitted and the discharge current during a discharge interval is suppressed by means of the DC current $i_d$. In addition, during the discharge interval each thyristor in the power rectifier 1 receives a reverse voltage and is detriggered to turn off. To cope with such a detriggering of each thyristor in the power rectifier 1, a gate pulse signal is continued to be fed to a gate terminal of each thyristor in the power rectifier 1 during the required conduction interval and is used to retrigger each thyristor during the end of discharge operation in the reactive power processing circuit 7.

Such operations in the main circuitry and control circuitry will be described in details below.

(1) Commutation Operation

When the invertor 3 is driven in six steps, six times of commutations are carried out for one period in the invertor 3. Each commutation is carried out in the same amnner.

Figure 4:
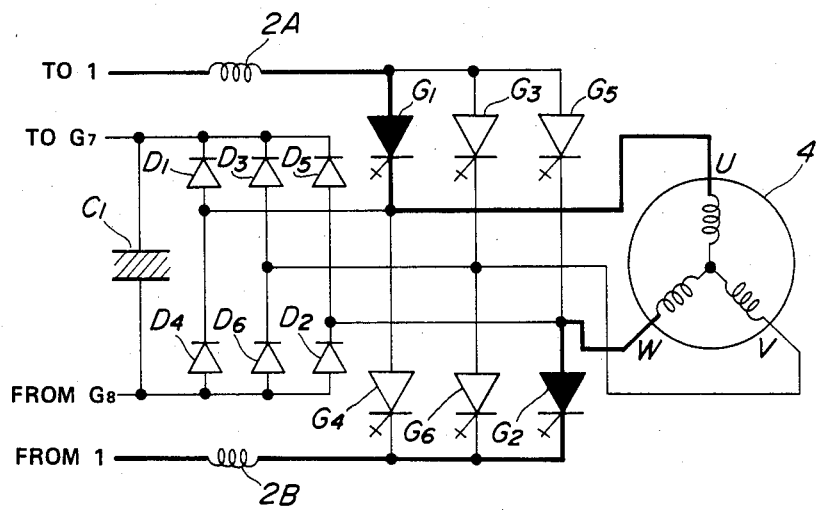
FIGS. 4(A) and 4(B) are circuit wiring diagrams of an essential part of the reactive power processing circuit shown in FIG. 3 for explaining current flows therein during commutation current operation intervals.
Figure 4:
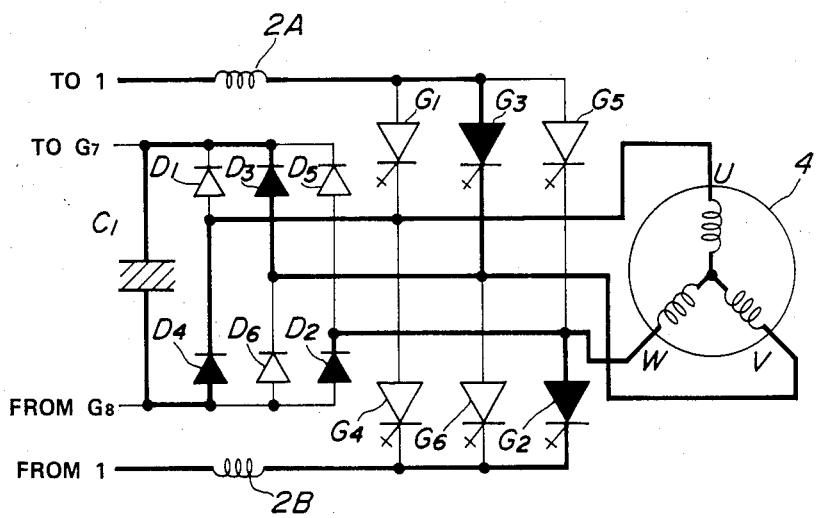

FIG. 4(A) and FIG. 4(B) show the invertor 3 having the six bridge-connected GTO thyristors $G_1$ through $G_6$, fly wheel circuit 5 having the six bridge-connected diodes $D_1$ through $D_6$, and the capacitor $C_1$ shown in FIG. 3 for explaining the commutation from the U phase of an upper arm to the V phase (from the GTO thyristor $G_1$ to $G_3$).

During a single current interval shown in Fig. 4(A), the GTO thyristor $G_1$ is turned off and at the same time the gate pulse signal is applied to the GTO thyristor $G_3$. A direct current which has flowed through the GTO thyristor $G_1$ is then transferred to a snubber circuit (not shown in the drawings) connected across the GTO thyristor $G_1$ so that a capacitor in the snubber circuit is charged.

The construction of the snubber circuit is exemplified by the Reference Record of the 1986 IEEE Industry Applications Society Annual Meeting Part I, pages 521 through 526.

When the voltage across the capacitor in the snubber circuit equals to the voltage across the capacitor $C_1$ in the reactive power processing circuit 7, the DC current flows into the GTO thyristor $G_3$. Consequently, the commutation overlap interval as shown in FIG. 4(B) results. The current flow through the GTO thyristor $G_3$ is branched to such a route as the diode $D_3 \rightarrow$ capacitor $C_1 \rightarrow$ diode $D_4 \rightarrow$ U phase in addition to the V phase due to an inductance of the load. Hence, a transient voltage generated across the U-V phase is limited by the voltage across the capacitor $C_1$. In addition, when the diode $D_4$ is conducted, the voltage across the U-W phase is applied to the diode $D_2$ so that the diode $D_2$ is also conducted. It should, however, be noted that when a slip in the motor 4 is small and a power factor of the motor 4 is low, the diode $D_2$ receives a reverse bias thereacross and does not conduct.

When the V phase current is increased together with the decrease in the U phase current during the commutation overlap interval and reaches the direct current $i_d$, the invertor 3 enters again the single current interval.

(2) Discharge Operation

An electric charge across the capacitor $C_1$ which has been charged during the commutation of the invertor 3 is discharged to the direct current side of the power rectifier 1 when both GTO thyristors $G_7$ and $G_8$ are triggered to turn on by means of trigger signals derived from the control circuit 30. The GTO thyristors $G_7$ and $G_8$ carry out the discharge oepration six times for one period, i.e., immediately before each commutation of the GTO thyristors $G_1$ through $G_6$ is carried out. During this discharge operation, each thyristor in the power rectifier 1 receives the reverse bias due to the presence of voltage across the capacitor $C_1$ and is detriggered to turn off. On the other hand, the discharge current $i_c$ shown in Fig. 3 becomes substantially equal to the direct current $i_d$. Since each thyristor of the power rectifier 1 during the end of discharge continues to receive the gate pulse signal derived from the control circuit 30 during the required conduction interval, the retriggering of each thyristor permits the conversion of the AC current from the current source to the corresponding DC current.

Hence, although the discharge current by means of the GTO thyristors $G_7$ and $G_8$ in the reactive power processing circuit 7 is suppressed by the direct current, the discharge can be achieved in the same operation during the powering and regenerating operations through an acceleration/deceleration operation for the motor 4. It is noted that during the regenerating operation for the motor 4 an average value of the output voltage $e_d$ of the power rectifier 1 may become negative and no problem arises when the output voltage $e_d$ becomes instantaneously positive.

The Applicant exercised experiments on the performance of the reactive power processing circuit according to the present invention. The induction motor 4 having the ratings of 400 Hz, 600W, 200V, 3.2A, and 23,100 r.p.m. was used. A discharge interval control to maintain the voltage across the capacitor $C_1$ at 160 volts constant was performed. In addition, an output line voltage was controlled so as to indicate V/f=0.5. As a result of a reversible operation from +200 Hz to −200 Hz of an invertor frequency and an acceleration/deceleration operation such as 50 Hz→200 Hz→50 Hz, stable operations of the reactive power processing circuit were confirmed during loading, unloading, and regeneration.

In addition, it was confirmed that the invertor output waveform was a low transient voltage in a 200 Hz operation with the commutation speedily completed.

As described hereinabove, since in the reactive power processing circuit for the current source GTO thyristor according to the present invention, only the pair of GTO thyristors are used to discharge an excessively charged capacitor to the direct current side of the power rectifier so as to achieve the regeneration to the direct current, no conventionally used cumulatively wound reactors and accompanied diodes are required. Therefore, the number of circuit elements are remarkably reduced. In addition, since the reactors are omitted, the reactive power processing circuit which enables a high-frequency operation of the invertor and extension of the variable frequency range thereof can be achieved.

It will fully be understood by those skilled in the art that the foregoing description is made in terms of the preferred embodiment and various modifications may be made without departing from the scope of the present invention which is to be defined by the appended claims.

What is claimed is:

1. A reactive power processing circuit for a current source invertor, comprising:
   (a) a power rectifier which carries out a gate phase control of a plurality of switching elements to convert an alternating current derived from an alternating current source into a corresponding direct current;
   (b) a smoothing circuit having at least one direct current reactor for smoothing the direct current derived from the power rectifier so as to produce a smoothed direct current;
   (c) an invertor main circuit having a plurality of bridge-connected gate turn off thyristors (GTO thyristors) for inverting the direct current derived from the smoothing circuit into an alternating current and for deriving a load with the alternating current at output sides thereof;
   (d) a fly wheel circuit having a plurality of bridge-connected diodes whose alternating current sides are connected to the corresponding output sides of the invertor main circuit, for rectifying a reactive current derived from the load;
   (e) a capacitor, connected across a direct current side of the fly wheel circuit, for storing a commutation surge voltage generated in the load;
   (f) a pair of GTO thyristors, connected to the capacitor in their forward directions, for operatively discharging a charge across the capacitor toard positive and negative poles of the power rectifier; and
   (g) a control circuit for triggering the pair of GTO thyristors to discharge the excessive charge across the capacitor and for continuing to send triggering pulses to the switching elements of the power rectifier for an interval required for a power rectifying operation of the power rectifier so that the switching elements are retriggered when a discharge operation of the pair of GTO thyristors is completed.

2. The reactive power processing circuit as set forth in claim 1, wherein the load is a three-phase induction motor having a reactance.

3. The reactive power processing circuit as set forth in claim 1, wherein the switching elements in the power rectifier comprise reverse blocked triode thyristors.

* * * * *